April 3, 1945.  J. M. BOVEE  2,372,930
FLEXIBLE SHANK TOOL
Filed Nov. 16, 1943
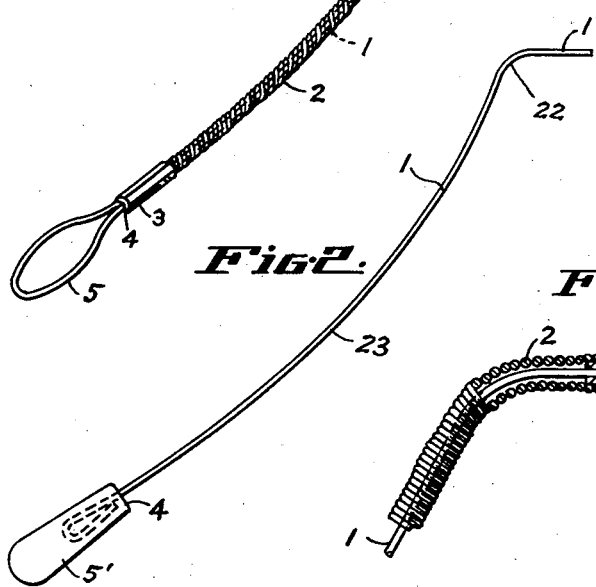
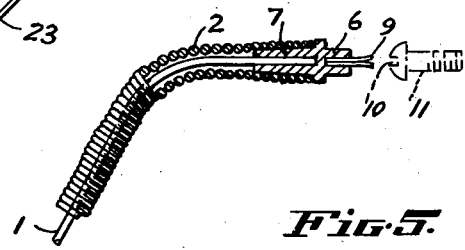
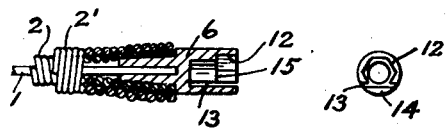
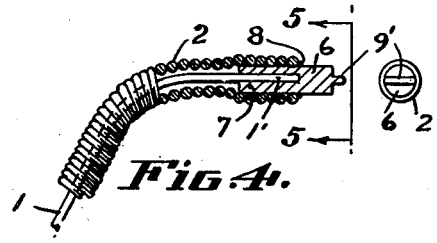
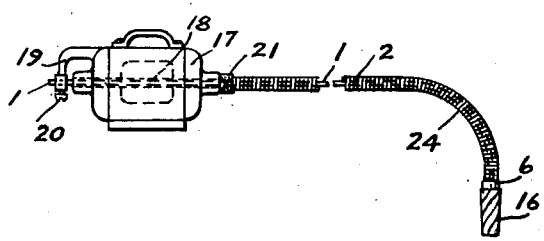
INVENTOR
JESSE M. BOVEE
BY
ATTORNEY.

Patented Apr. 3, 1945

2,372,930

UNITED STATES PATENT OFFICE 2,372,930

FLEXIBLE SHANK TOOL

Jesse M. Bovee, San Francisco, Calif.

Application November 16, 1943, Serial No. 510,501

5 Claims. (Cl. 145—61)

This invention relates to mechanics tools having flexible shanks for reaching into places where it is difficult to operate with rigid shank tools and the principal object of the invention is to provide an improved flexible shank tool such as a screw driver, nut wrench, reamer, drill, or the like which will have a semi-rigid tho bendable shank which will hold its shape when bent to the desired shape for reaching the work to be operated upon, and which shank may be operated while in such deformed condition.

Specific advantages of the invention will appear in the following description and accompanying drawing.

In the drawing,

Fig. 1 is a side view of a screw driver with a long flexible or bendable shank made in accordance with my invention.

Fig. 2 is a detached view of the bendable wire core of the tool as of Fig. 1 but with a different handle.

Fig. 3 is an enlarged side view and partly broken open detail of the outer end of a screw driver as of Fig. 1 but with a spring nib for engaging the slot of a screw so it will not fall off when starting it in a threaded hole.

Fig. 4 is a detail similar to that of Fig. 3 but showing the solid nib of Fig. 1.

Fig. 5 is an end view of Fig. 4 as seen from the lines 5—5 thereof.

Fig. 6 is an enlarged partly sectional side view of the outer end of the tool showing it fitted with a nut socket wrench instead of a screw driver.

Fig. 7 is an end view of the socket wrench of Fig. 6.

Fig. 8 is a side view showing the flexible or bendable shank fitted with a reamer and operated by a small portable electric motor.

Briefly described the improvement in flexible shanks comprises the provision of a single central wire or core formed of a substantially rigid but bendable wire, that is, a single wire of a quality and thickness which may be bent as desired by the mechanic to a curve or curves to reach into some place difficult of access with a straight shank tool, and when so bent it will keep its shape until forcibly bent to some different shape for some other job, or it may be used straight if desired.

This central core or supporting wire is designated 1 in the drawing, and supported upon it is a flexible shaft 2 which is here shown as a tubular or helical wire spring, tho it may be any other flexible tube such as a reinforced hose, but I prefer the tubular wire spring as there is very little friction between it and the solid wire core when the spring is revolved.

The spring fits loosely over the wire core and has a sleeve or operating nut 3 soldered or otherwise secured to its lower end which is close to or abuts the upper end 4 of a handle which may be formed of the core wire itself as at 5 in Fig. 1 or may be a separate handle 5' as shown in Fig. 2 and which is rigidly secured to the wire core in any desired manner.

At the outer end of the flexible hollow shaft 2 is a tool bit or head 6 which has a shank 7 tightly fitted within the hollow shaft, either by being tapered and forced or screwed in as per Fig. 3, or soldered to the shank as at 8 in Fig. 4, and the shank 7 is drilled to revolvably fit over the outer end 1' of the core wire which is always maintained straight for a short distance so that the shank 7 will revolve freely upon it when the spring or hollow shaft is turned by the sleeve or nut 3.

As the tool is of greatest use for light work such as turning the screws and nuts in typewriters, computing machines, etc. where many of them are ordinarily difficult of access, the operating sleeve or nut 3 may be turned by hand to develop sufficient force at the head or bit, and of course this sleeve may be made as large as desired and provided with any desirable gripping surface such as knurling, and in some cases a small wrench may be applied to the outside of the sleeve or nut 3 to start loosening a nut or screw or finally tightening it in place, the sleeve 3 is shown hexagonal for this purpose.

The bit may be different forms and be interchangeable, particularly if its shank is tapered and tightly wedged into the spring as indicated in Fig. 3, and some of the forms are shown in the drawing. In Fig. 3 the bit is a screw driver with a pair of spring nibs 9 projecting from it adapted to be compressed to engage the slot 10 of a screw indicated in dotted lines 11, while in Fig. 5 the screw driver nib 9' is shown solid, and preferably it is magnetized to hold the screw in place.

In Fig. 6 the bit 6 is formed with a wrench socket to receive a small hexagon nut, and one side of the socket is slotted down as at 13 to form a spring jaw 14 which is biased to frictionally hold the nut within the socket. The socket is made deeper than the nut so as to get enough spring to the jaw 14, but a shoulder 15 is provided within the socket for the nut to rest upon. In Fig. 6 the hollow spring shaft is made double, that is, of two helical springs 2 and 2' of opposite pitch in overlying relation so as to transmit the turning effort somewhat better in either direction.

In Fig. 8 the bit is shown as fitted with a reamer 16 and the flexible shaft operated by a small electric motor 17. To accomplish this the shaft 18 of the motor is made hollow and the core wire 1 is extended freely through it and secured rigidly to the motor frame as by a bracket 19 and screw 20, while the end of the flexible shaft 2 is suitably secured to the extended rotating end of the hollow motor shaft as indicated at 21.

It should be noted that the two bends shown in the core wire in Fig. 2 at 22 and 23 and the bend at 24 in Fig. 8 are only temporary, that is, they may be straightened out, or bent to any other curve by the mechanic, and this may be done while the flexible shaft is in place or if it is removed, and once the shank is bent to the desired form to best reach the work it will so remain while in use, and until forcibly altered by re-bending.

In use of the tool it is desirable to steady the flexible shaft adjacent the bit end with one hand while the shaft is turned when the motor driven tool is used, but with the handle type of tool sufficient pressure may be put upon the work by the force used upon the handle.

Having thus described my invention and the manner of its use, what I claim is:

1. In a mechanics tool an elongated shank comprising a central supporting wire with a flexible hollow shaft rotatably supported thereon, a tool shank secured to one end of the hollow shaft and provided with means rotatably supporting it on the outer end of said supporting wire, said supporting wire being of a size and character adapted to be bent to a desired form and to retain its bent form until forcibly straightened out or bent to some other desired form, means at the opposite end of said supporting wire to prevent its rotation, and means at the adjacent end of said hollow shaft adapted for rotating said shaft.

2. In a mechanics tool an elongated shank comprising a central supporting wire with a flexible hollow coiled wire spring rotatably supported thereon, a tool shank secured to one end of the hollow coiled spring and provided with means rotatably supporting it on the outer end of said supporting wire, said supporting wire being of a size and character adapted to be bent to a desired form and to retain its bent form until forcibly straightened out or bent to some other desired form, a handle secured to the opposite end of said supporting wire, and means adjacent the handle adapted for rotating said coiled spring.

3. In a structure as set out in claim 1, said tool shank provided with an axial bore in which the end of the supporting wire extends.

4. In a structure as set out in claim 1, the means for rotating the hollow shaft comprising a multi-sided sleeve secured to the flexible shaft and adapted for gripping by a wrench.

5. In a structure as set out in claim 1, the means for rotating the hollow shaft comprising an electric motor provided with a hollow armature shaft secured to the end of said hollow flexible shaft, and the means to prevent rotation of the supporting wire comprising the extension of said wire through the hollow armature shaft and means securing it to the frame of the motor.

JESSE M. BOVEE.